June 8, 1965   J. C. RENTZ   3,188,618
POSITIVE LOCKOUT CONTROL FOR OIL AND WATER BATHS
Filed May 21, 1962

INVENTOR
John C. Rentz

BY George Renehan
ATTORNEY ed States Patent Office 3,188,618
Patented June 8, 1965

3,188,618
POSITIVE LOCKOUT CONTROL FOR OIL AND WATER BATHS
John C. Rentz, Abingdon, Md., assignor to the United States of America as represented by the Secretary of the Army
Filed May 21, 1962, Ser. No. 196,537
2 Claims. (Cl. 340—227)
(Granted under Title 35, U.S. Code (1952), sec. 266)

The invention described herein may be manufactured and used by or for the Government of the United States of America for governmental purposes without the payment to me of any royalty thereon.

This invention relates to a positive lockout control for electric circuits. More specifically, it relates to a control unit suitable for being interposed between an electrical supply and a load. This load may be in the nature of an oil or water bath or constant temperature drying oven and the like, which it is sought to maintain at constant temperature. If the water temperature rises beyond the preset maximum, a heat sensitive control triggers the unit to interrupt the power supply simultaneously with the illumination of a signal light. To reestablish the current supply then requires a manual resetting of the unit. Alternately, the unit may be set to operate an alarm or other device which is normally in an "off" or inactive state but which is triggered by excess heat, pressure or other circumstance and when so triggered the circuit remains active until manually reset to interrupt the power supply. In this instance also, a signal light shows.

Figure 1:
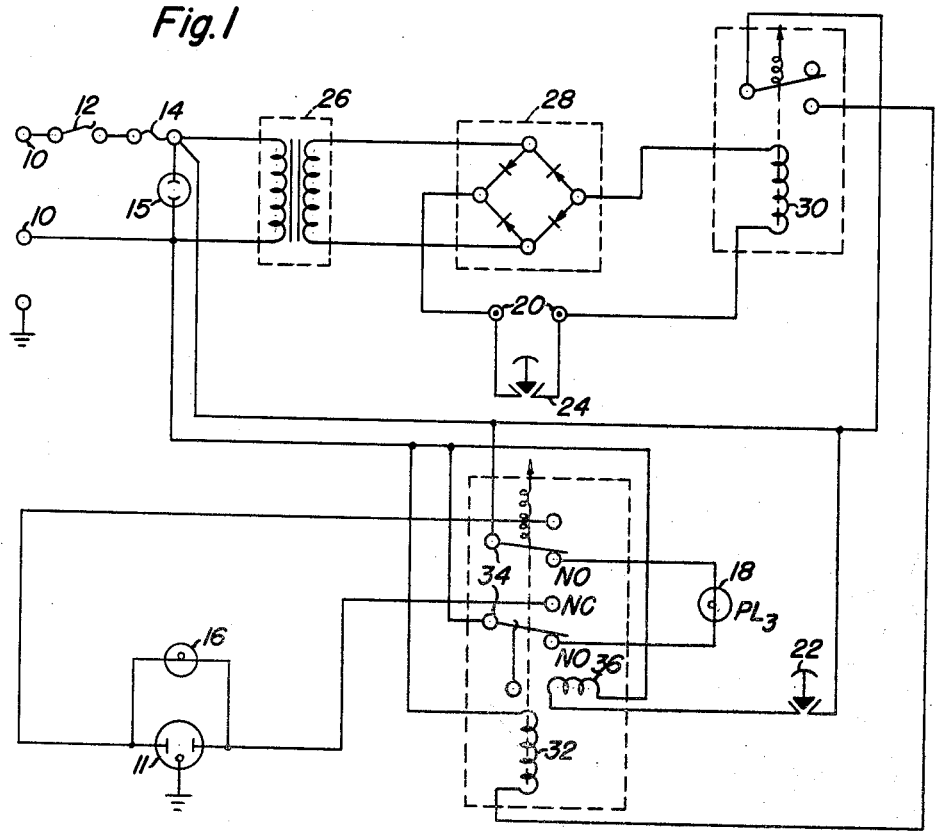
Figure 2:
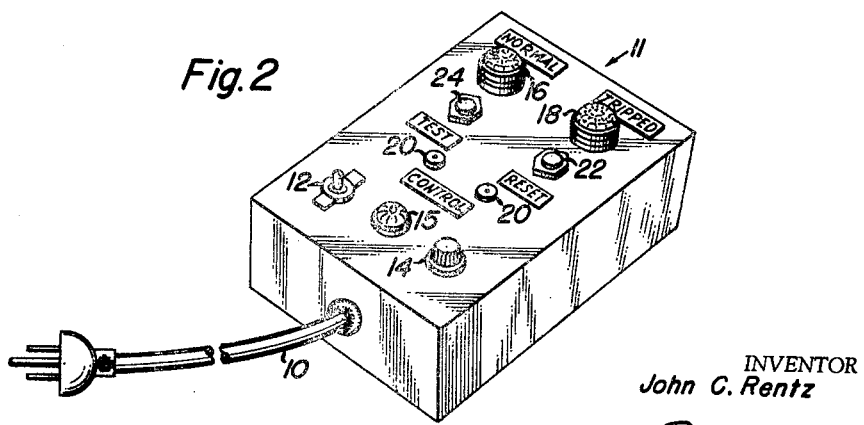

In the drawing, FIG. 1 shows the electric circuit while FIG. 2 shows a perspective view of the unit.

The circuit of FIG. 1 shows the operation of the device clearly. Power input is shown at 10. This input contains switch 12 and fuze 14, after which follows the primary of transformer 26. The 6.3 volt secondary of the transformer enters the bridge rectifier unit 28 which in turn supplies current to the relay 30. In the circuit to this relay is test switch 24 and control jacks 20, 20. This relay actuates a single pole single throw switch which is spring biased to the open position. When closed, this switch powers relay 32 which in turn actuates double pole double throw power switch 34. This switch is latched in one position and spring biased in the opposite position. In the latched position which is the position opposed to the spring bias, power is interrupted through power outlet 11, light 16 in parallel with this outlet is then off and light 18 is on. Latching relay 36 includes reset switch 22 in circuit so that the closing of switch 22 serves to retract the latch thereby causing the spring bias to shift the double throw switch to reconnect the power outlet and to place light 16 in circuit. Thus, when the lockout control is in use, a quick inspection of the lights will show whether or not there is power into the unit and whether or not there is power output from the unit. If the unit is "tripped" light 18 will show that state of affairs and pressing reset switch 22 will again restore power output.

The use of a stepdown transformer and rectifier is necessary to actuate relay 30 since the switching input to 20, 20 is often in the form of a relatively sensitive temperature or pressure switch which is capable of switching only low voltage direct current. When it is desired to utilize the unit to turn on a circuit, such as a burglar alarm, the output terminals from switch 34 are reversed so that power is transmitted through the power socket 11, when the switch 34 is in the latched position.

FIG. 2 clearly shows the arrangement of parts including power input 10, power output socket 11 at the opposite end of the unit, on off switch 12, fuze 14, power input pilot light 15, signals lights 16 and 18. Control sockets 20, 20 when shorted serve to trigger the unit. When the device is thus triggered, light 18 turns on and the power supply through the unit is interrupted. To reset the unit, button 22 is depressed whereupon light 18 goes off, light 16 goes on and power conductivity through the unit is restored. Correspondingly, if the desired normal state of the device is "off" the trigger pulse will turn it on, light 16 will go on and light 18 will go off. Pressing test button 24 will then restore the unit to the original "off" condition. This makes the unit very versatile to cover both an "on" or "off" normal operation whereupon the trigger pulse will provide the other alternative.

A practical use of the unit is to protect a constant temperature water bath. The electrical heating unit to such a bath is plugged into socket 11 and input 10 to the control is plugged into a 115 A.C. source. A thermo sensitive switch which is set at a value above the constant temperature bath is plugged into 20, 20. Reset switch 22 is closed to energize the unit. Should the temperature of the bath rise above that preset by the thermosensitive switch the unit is tripped, light 18 goes on and power through the unit is interrupted. Thus it is impossible for the bath to overheat and damage can be held to a minimum.

I claim:

1. A power control device of the character described comprising in combination two terminal power input means, two terminal power output means, control circuit means interconnecting said power input and output means, said control circuit means consisting of a direct current supply, a thermal switch, a single pole relay and a two pole double throw relay, said direct current supply, thermal switch and the coil of said single pole relay being serially connected, the pole of said single pole relay being connected to one terminal of said two terminal input means and to a first pole of said two pole relay, the contact of said single pole relay connected to the other terminal of said two terminal input means through the coil of said two pole relay, a second pole of said two pole relay connected to said other terminal of said two terminal input means, said first and second poles normally in contact with a pair of contacts connected to said two terminal output means, a second pair of contacts connected to an indicating lamp, said single pole relay in response to the closing of said thermal switch activating the double pole double throw relay whereby the two terminal power output means is disconnected from the two terminal power input means and the indicating lamp connected to said two terminal power input means, and latching means for releasably retaining said two pole relay in this position.

2. The invention as set forth in claim 1 wherein said latching means comprises a latching relay having its coil connected to said two terminal input means through a switch which when in closed position causes said latching relay to release said two pole relay whereby said two terminal output means is connected to said two terminal input means.

References Cited by the Examiner
UNITED STATES PATENTS

| | | | |
|---|---|---|---|
| 2,717,957 | 9/55 | Ohlheiser | 317—149 X |
| 2,735,039 | 2/56 | Schuh | 317—151 X |
| 2,964,685 | 12/60 | Raymond | 317—155.5 X |

SAMUEL BERNSTEIN, *Primary Examiner.*